(12) United States Patent
Park et al.

(10) Patent No.: US 12,479,392 B2
(45) Date of Patent: Nov. 25, 2025

(54) OPENING STRUCTURE FOR A ROOF AIRBAG

(71) Applicants: HYUNDAI MOTOR COMPANY, Seoul (KR); KIA CORPORATION, Seoul (KR); DAEHAN SOLUTION CO., LTD., Incheon (KR)

(72) Inventors: Ji Seob Park, Incheon (KR); Ji Yun Ha, Suwon-si (KR); Min Ho Cho, Suwon-si (KR); Hong Seong Gim, Seoul (KR); Ho Young Jeoung, Gwangmyeong-si (KR); Choong Ho Kwon, Seoul (KR)

(73) Assignees: HYUNDAI MOTOR COMPANY, Seoul (KR); KIA CORPORATION, Seoul (KR); DAEHAN SOLUTION CO., LTD., Incheon (KR)

( * ) Notice: Subject to any disclaimer, the term of this patent is extended or adjusted under 35 U.S.C. 154(b) by 0 days.

(21) Appl. No.: 18/733,986

(22) Filed: Jun. 5, 2024

(65) Prior Publication Data

US 2025/0153674 A1 May 15, 2025

(30) Foreign Application Priority Data

Nov. 14, 2023 (KR) .......................... 10-2023-0156977

(51) Int. Cl.
*B60R 21/214* (2011.01)
*B60R 21/215* (2011.01)
*B60R 21/231* (2011.01)

(52) U.S. Cl.
CPC .......... *B60R 21/214* (2013.01); *B60R 21/215* (2013.01); *B60R 21/231* (2013.01);
(Continued)

(58) Field of Classification Search
CPC . B60R 21/214; B60R 21/215; B60R 21/2165; B60R 21/231; B60R 2021/21512; B60R 2021/23192; B60R 2021/23153; B60R 2021/23161; B60R 2021/21525; B60R 21/213
See application file for complete search history.

(56) References Cited

U.S. PATENT DOCUMENTS 6,189,960 B1 * 2/2001 Mumura ................ B60J 7/0015
 180/281
6,588,793 B2 * 7/2003 Rose ..................... B60R 21/237
 280/728.2
(Continued)

FOREIGN PATENT DOCUMENTS

JP 10264761 A * 10/1998
JP 2021030815 A * 3/2021
(Continued)

*Primary Examiner* — Laura Freedman
(74) *Attorney, Agent, or Firm* — Lempia Summerfield Katz LLC (57) ABSTRACT

An opening structure for a roof airbag includes: a roof lining having an opening; the roof airbag disposed at an interior side of the roof lining; a roof airbag door disposed at the opening in the roof lining at a position where the roof airbag is deployed; and a fixation unit positioned between the roof airbag door and the roof lining. The roof airbag door has an outer lining inserted into and overlapping the roof lining.

11 Claims, 5 Drawing Sheets

(52) U.S. Cl.
    CPC .............. *B60R 2021/21512* (2013.01); *B60R 2021/23192* (2013.01)

(56) References Cited

U.S. PATENT DOCUMENTS

| | | | | |
|---|---|---|---|---|
| 6,817,626 B2* | 11/2004 | Boll | ..................... | B60R 21/213 |
| | | | | 280/730.1 |
| 6,883,828 B2* | 4/2005 | Ohki | ..................... | B60R 13/025 |
| | | | | 280/730.2 |
| 6,913,280 B2* | 7/2005 | Dominissini | ......... | B60R 21/213 |
| | | | | 296/214 |
| 7,918,480 B2* | 4/2011 | Kwon | ................... | B60R 21/216 |
| | | | | 280/730.2 |
| 8,240,706 B2* | 8/2012 | Bustos Garcia | ...... | B60R 21/261 |
| | | | | 280/728.2 |
| 8,602,448 B2* | 12/2013 | Choi | ..................... | B60R 21/214 |
| | | | | 280/730.1 |
| 9,296,351 B1* | 3/2016 | Madrigal Medina | ... | B60R 21/13 |
| 11,214,217 B2* | 1/2022 | Gould | ................... | B60R 21/214 |
| 11,220,226 B2* | 1/2022 | Forgette | ............. | B60R 13/0225 |
| 11,648,908 B2* | 5/2023 | Sung | ..................... | B60R 21/231 |
| | | | | 280/730.1 |
| 11,772,594 B2* | 10/2023 | Min | ..................... | B60R 21/214 |
| | | | | 280/728.2 |
| 2010/0327567 A1* | 12/2010 | Choi | .................. | B60R 21/2176 |
| | | | | 280/730.2 |

FOREIGN PATENT DOCUMENTS

| | | | |
|---|---|---|---|
| JP | 2021054099 A | * | 4/2021 |
| KR | 20030063738 A | | 7/2003 |

* cited by examiner

OPENING STRUCTURE FOR A ROOF AIRBAG

CROSS-REFERENCE TO RELATED APPLICATION

This application claims the benefit of and priority to Korean Patent Application No. 10-2023-0156977, filed on Nov. 14, 2023, the entire contents of which are incorporated herein by reference.

TECHNICAL FIELD

The present disclosure relates to an opening structure for a roof airbag. More particularly, the present disclosure relates to a roof airbag opening structure including a fastening structure.

BACKGROUND

Generally, vehicles transport passengers. Airbag devices are installed in the vehicles to ensure the safety of the drivers and passengers. A roof airbag may be installed in a roof lining located at the ceiling of a vehicle. The roof airbag may be inserted inside the roof lining, and may deploy outside the roof lining when a collision, such as a vehicle rollover, occurs.

However, a problem arises in that the roof lining is not fully opened when the roof airbag is deployed. Moreover, with the recent increase in the number of vehicles with seats facing each other, a problem has arisen in which the roof lining is partially cut when the roof airbag is deployed and rotates to open to one side where the passengers are seated.

The above information disclosed in this Background section is only to enhance understanding of the background of the present disclosure. Therefore, the Background section may contain information that does not form the prior art that is already known to a person of ordinary skill in the art.

SUMMARY

The present disclosure has been made to solve the above-described problems associated with the prior art, and it is an object of the present disclosure to provide a roof airbag door capable of being independently detached from the roof lining when the roof airbag is deployed, and a fixation structure that allows the roof airbag door to be mounted inside the roof lining.

Another object of the present disclosure is to provide a roof airbag opening structure including a roof airbag door constructed independently of a roof lining, and a fixation unit configured to fasten the roof airbag door to the roof lining.

Another object of the present disclosure is to provide a fastening structure of the fixation unit which allows the roof lining and the roof airbag door to be detached from each other when the roof airbag is deployed.

The objects of the present disclosure are not limited to the foregoing, and other objects of the present disclosure not mentioned herein may be understood based on the following description, and may be understood more clearly through the embodiments of the present disclosure. In addition, the objects of the present disclosure may be realized by means and combinations thereof indicated in the claims.

The opening structure for the roof airbag that achieves the above-described objects of the present disclosure includes the following configuration.

In one aspect, the present disclosure provides an opening structure for a roof airbag. The opening structure includes: a roof lining having an opening; the roof airbag disposed at an interior side of the roof lining; a roof airbag door disposed at the opening in the roof lining at a position where the roof airbag is deployed; and a fixation unit positioned between the roof airbag door and the roof lining. The roof airbag door has an outer lining inserted into and overlapping the roof lining.

In an embodiment, the fixation unit may include a fixation portion positioned on one surface of the roof lining and configured to press against the roof airbag door that is inserted to overlap the roof lining.

In another embodiment, the fixation portion may include at least one toothed structure provided at a position where the fixation portion faces the roof airbag door.

In still another embodiment, one end of the fixation portion disposed away from the roof airbag door may be hot-melt coupled to the one surface of the roof lining.

In yet another embodiment, the fixation unit may include a bracket disposed at one surface of the roof lining, and at least one hook portion protruding from an external side of the bracket. The bracket may be inserted into a locking hole formed in the roof airbag door, and the hook portion may be positioned at one surface of the roof airbag door adjacent to the locking hole.

In still yet another embodiment, the opening structure may further include a fixation hole formed in the bracket, and a hook-fixation portion inserted into the fixation hole and fastened to a roof panel.

In a further embodiment, one end of the bracket disposed away from the roof airbag door may be hot-melt coupled to one surface of the roof lining.

In another further embodiment, the opening structure may further include a slit portion formed in the roof airbag door adjacent to the locking hole.

In still another further embodiment, the opening structure may further include a groove formed in the roof airbag door in at least one direction.

In another aspect, the present disclosure provides an opening structure for a roof airbag. The opening structure includes: a roof lining having an opening; the roof airbag disposed at an interior side of the roof lining; a roof airbag door disposed at the opening in the roof lining at a position where the roof airbag is deployed; and a fixation unit positioned between the roof airbag door and the roof lining. The roof airbag door has an outer lining inserted into and overlapping the roof lining. The roof airbag door may be detached from the fixation unit when the roof airbag is deployed.

In an embodiment, the fixation unit may include a fixation portion positioned on one surface of the roof lining and configured to press against the roof airbag door that is inserted to overlap the roof lining.

In another embodiment, one end of the fixation portion disposed away from the roof airbag door may be hot-melt coupled to the one surface of the roof lining.

In still another embodiment, the fixation unit may include a bracket disposed at one surface of the roof lining, and at least one hook portion protruding from an external side of the bracket. The bracket may be inserted into a locking hole formed in the roof airbag door, and the hook portion may be positioned at one surface of the roof airbag door adjacent to the locking hole.

In yet another embodiment, the locking hole in the roof airbag door may be detached from the bracket when the roof airbag is deployed.

Other aspects and embodiments of the present disclosure are discussed below.

It should be understood that the terms "vehicle," "vehicular," or other similar terms as used herein are inclusive of motor vehicles in general. Such motor vehicles may include sport utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle powered by both gasoline and electricity.

The above and other features of the present disclosure are discussed below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

It should be understood that the appended drawings are not necessarily drawn to scale, presenting a somewhat simplified representation of various features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Hereinafter, the embodiments of the present disclosure are described in detail with reference to the accompanying drawings. The embodiments of the present disclosure may be modified into various forms, and the scope of the present disclosure should not be construed as being limited to the following embodiments. The embodiments are provided to completely explain the present disclosure to those having ordinary skill in the art.

In addition, terms such as " . . . portion," " . . . unit," and the like, used in this specification, each refer to a unit that processes at least one function or operation, and may be implemented as hardware, software or a combination thereof.

The terminology used herein is for the purpose of describing the embodiments only, and is not intended to be limiting. A singular representation may include a plural representation unless it represents a definitely different meaning from the context.

An embodiment is described in detail with reference to the accompanying drawings, and in the description given with reference to the accompanying drawings, the same or corresponding components are assigned the same reference numerals, and a description thereof is not repeated.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

The present disclosure relates to an opening structure 1 for a roof airbag 20. More specifically, it relates to a fastening structure of a roof airbag door 100 which is configured to be detached from a roof lining 10 when the roof airbag 20, disposed inside the roof lining 10, is deployed.

Figure 1:
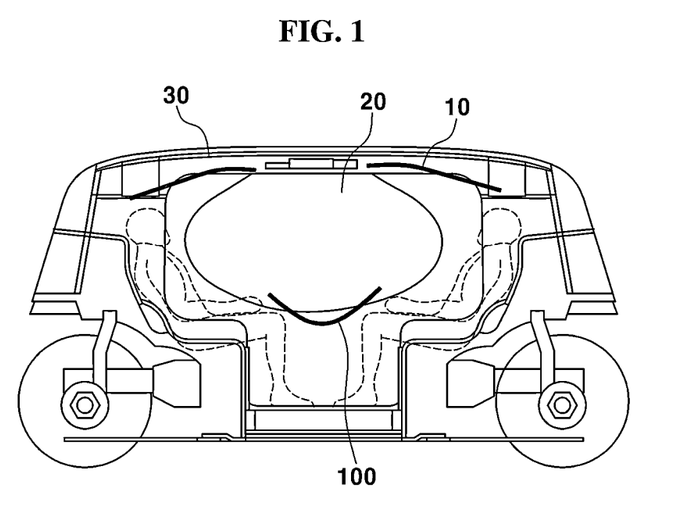
FIG. 1 illustrates a side view of a vehicle including a roof airbag opening structure as an embodiment of the present disclosure.
Figure 2:
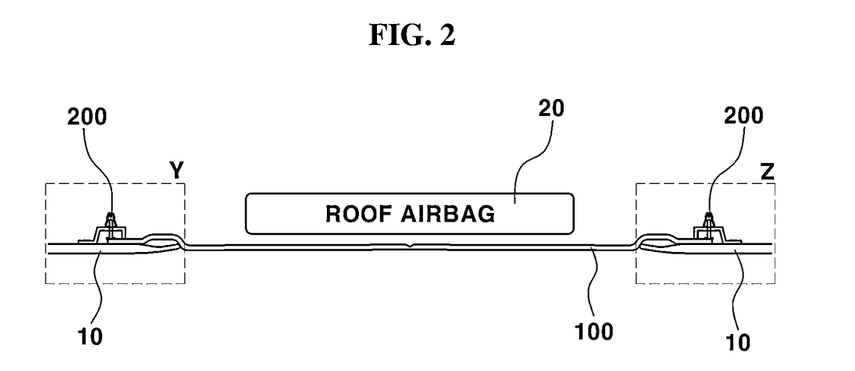
FIG. 2 illustrates a side view of a roof including a roof airbag opening structure as an embodiment of the present disclosure.
Figure 3:
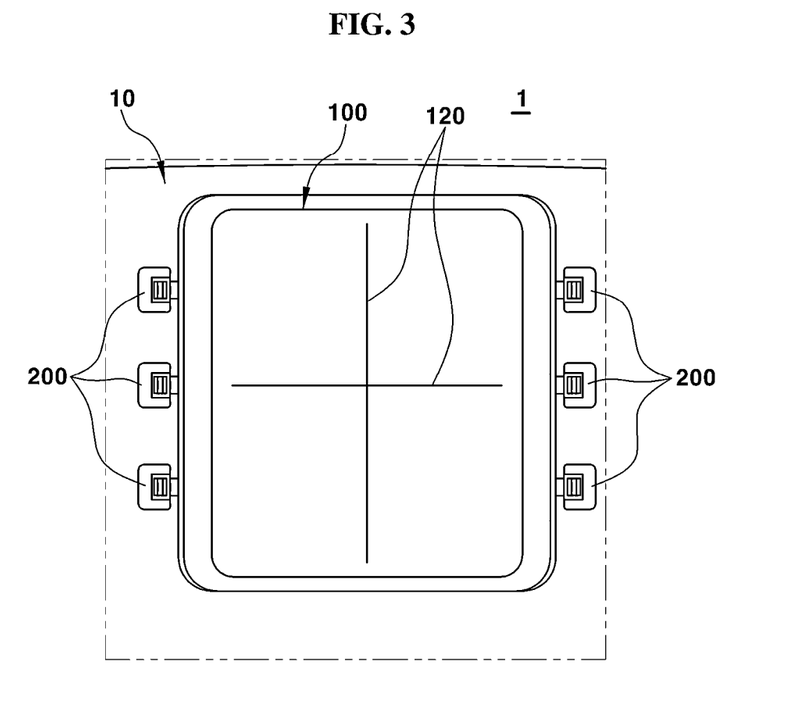
FIG. 3 illustrates a roof including a roof airbag opening structure as an embodiment of the present disclosure.

FIGS. 1-3 illustrate, as one embodiment of the present disclosure, the deployment of the roof airbag 20 of a vehicle, including two rows of seats facing each other. Additionally, the detachment structure of the roof airbag door 100 when the roof airbag 20 is deployed is also depicted.

As illustrated in the drawings, the roof airbag 20 is fixed to a roof panel 30. The roof panel 30 includes the roof lining 10, surrounding the lower end of the roof airbag 20. The roof lining 10 includes an opening 11 formed in a direction in which the roof airbag 20 is deployed. Furthermore, the roof airbag door 100 is disposed at the opening 11 in the roof lining 10 by facing the roof airbag 20.

The roof airbag 20 may be controlled to deploy when a controller in the vehicle receives an impact via a collision detection sensor. The controller is an electric control unit (ECU) at an ECU level, which may be a device configured to comprehensively control multiple electronic devices used in the vehicle.

For example, the controller may control both processors at a processor level and controllers at a controller level. The controller may receive sensed data from the processors, generate control commands to control the controllers depending on situations, and transmit the control commands to the controllers. With this process, the controller may deploy the roof airbag 20 in response to the impact received from at least one collision detection sensor disposed in the vehicle.

The roof airbag 20 may be fixed to a roof frame and is configured to deploy in response to a command from the controller. Because the roof airbag 20 is configured to deploy towards an area between the seats facing each other in the interior space in the vehicle, when the roof airbag 20 is deployed, the roof airbag door 100 positioned in the roof lining 10 is detached from the roof lining 10. Thus, the roof airbag 20 is deployed into the space between the seats facing each other in the vehicle.

With this configuration, the opening structure 1 includes the opening 11 formed in the roof lining 10 in the direction in which the roof airbag 20 is deployed, and at least one fixation unit 200 configured to fasten the roof airbag door 100 positioned in the opening 11 to one interior surface of the roof lining 10.

In the drawings, 6 fixation units 200 are depicted, however, for simplicity, reference is made to one fixation unit 200.

The fixation unit 200 is hot-melt 300 coupled to an upper surface of the roof lining 10, and is configured to fasten the roof lining 10 and the roof airbag door 100 to each other. The hot-melt 300 may be an adhesive used to create a strong bond. Furthermore, the fixation unit 200 has a shape that allows the roof airbag door 100 to be detached from the roof lining 10 when the roof airbag 20 is deployed.

In one embodiment of the present disclosure, the fixation unit 200 may be configured to integrally press an area where the roof lining 10 and the roof airbag door 100 overlap each other. In a different embodiment of the present disclosure, the roof airbag door 100 may be hooked and fixed to the fixation unit 200 which is fixed to the roof lining 10.

Because the roof airbag door 100 is positioned in the roof lining 10 by being inserted thereinto, the roof airbag door 100 positioned in the opening 11 in the roof lining 10 may have a protruding shape but flush with the roof lining 10. Moreover, the roof airbag door 100 inserted into the roof lining 10 may have a shape curved in a height direction to have a predetermined distance from a portion surrounding the opening 11 in the roof lining 10. Therefore, when the roof airbag 20 is deployed, the roof airbag door 100, which is fastened to the fixation unit 200 with respect to the area having the curved shape, folds. Accordingly, when the roof airbag 20 is deployed, the roof airbag door 100 is detached from the roof lining 10.

A rear surface of the roof airbag door 100 is positioned to face the interior space. The rear surface of the roof airbag door 100 may have a groove 120 formed in at least one direction. The groove 120 has an engraved shape in the roof airbag door 100 facing the roof airbag 20. The groove 120 facilitates vertical detachment of the roof airbag door 100 and guides the folding direction of the roof airbag door 100 when the roof airbag door 100 is detached. More particularly, in one embodiment of the present disclosure, two grooves 120 may be formed and be perpendicular to each other. In other words, the grooves 120 in the roof airbag door 100 are configured to induce a vertical descent of the roof airbag door 100 in response to the deployment of the roof airbag 20.

Figure 4A:
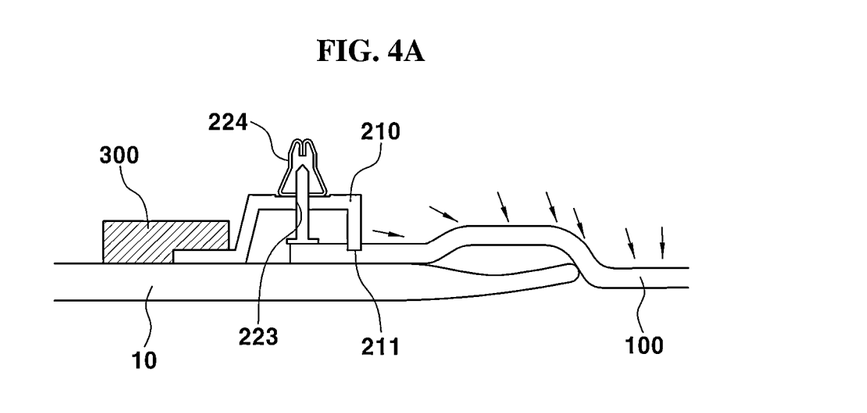
FIG. 4A illustrates a fastening relationship of a fixation unit of a roof airbag opening structure as an embodiment of the present disclosure.
Figure 4B:
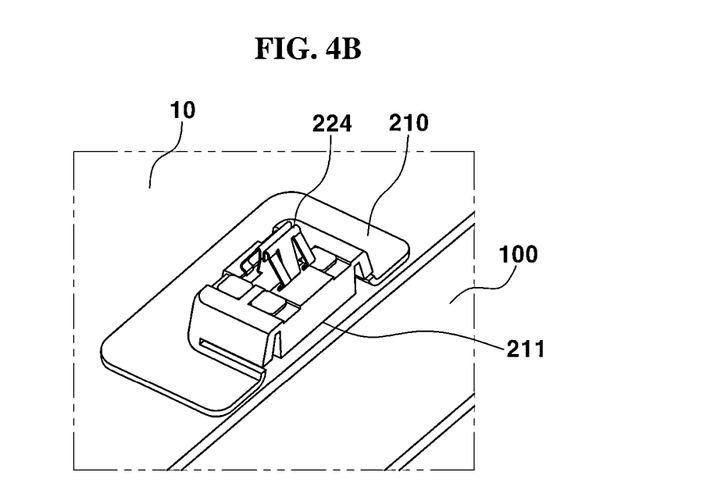
FIG. 4B illustrates a fixation portion of a fixation unit of a roof airbag opening structure as an embodiment of the present disclosure.

FIGS. 4A and 4B illustrate the structure of the fixation unit 200 constituting the Y area in FIG. 2 as an embodiment of the present disclosure.

As illustrated in the drawings, the fixation unit 200 includes a fixation portion 210 fixed to the roof lining 10. The fixation portion 210 is configured to press the area where the roof lining 10 and the roof airbag door 100 overlap each other. More particularly, one end of the fixation portion 210 disposed away from the roof airbag door 100 is hot-melt 300 coupled to the roof lining 10, and another end of the fixation portion 210 includes a toothed structure 211 so as to integrally press the roof airbag door 100 against the roof lining 10.

As illustrated in FIG. 4B, because the toothed structure 211 in the fixation portion 210 is configured to press at least a portion of the roof airbag door 100 against the roof lining 10 simultaneously, at least a portion of the toothed structure 211 in the fixation portion 210 may be inserted into the upper surface of the roof airbag door 100.

In one embodiment of the present disclosure, in a case where the fixation portion 210 including the toothed structure 211 is employed as the fixation unit 200, when the roof airbag 20 is deployed, a tension same as or greater than the tension of the fixation portion 210 pressed when the roof airbag 20 is deployed is applied to the roof airbag door 100 and the roof airbag door 100 is detached from the fixation portion 210.

The fixation portion 210 includes a fixation hole 223, and a hook (e.g., hook-fixation portion) 224 fastened to the roof panel 30 may be positioned in the fixation hole 223. Accordingly, the fixation portion 210 hot-melt 300 coupled to the roof lining 10 is fixed to the roof panel 30 using the hook.

Figure 5A:
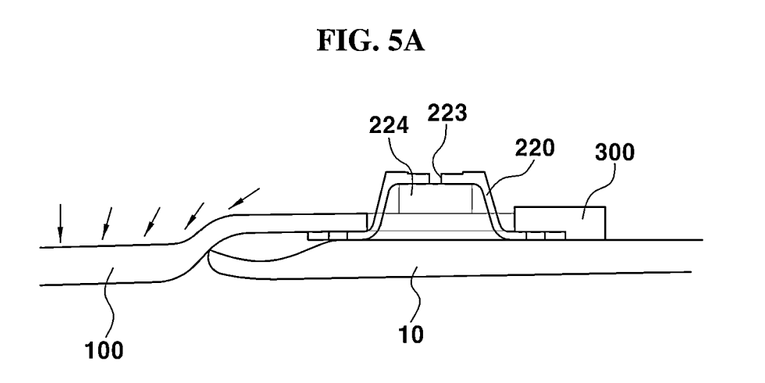
FIG. 5A illustrates a fastening relationship of a fixation unit of a roof airbag opening structure as another embodiment of the present disclosure.
Figure 5B:
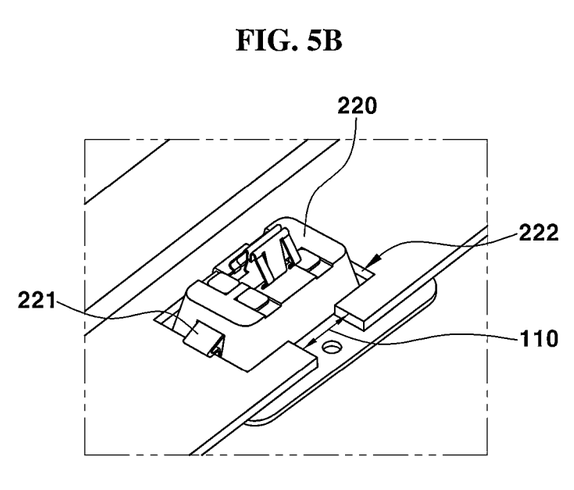
FIG. 5B illustrates a fastening relationship of a fixation unit of a roof airbag opening structure as another embodiment of the present disclosure.
Figure 5C:
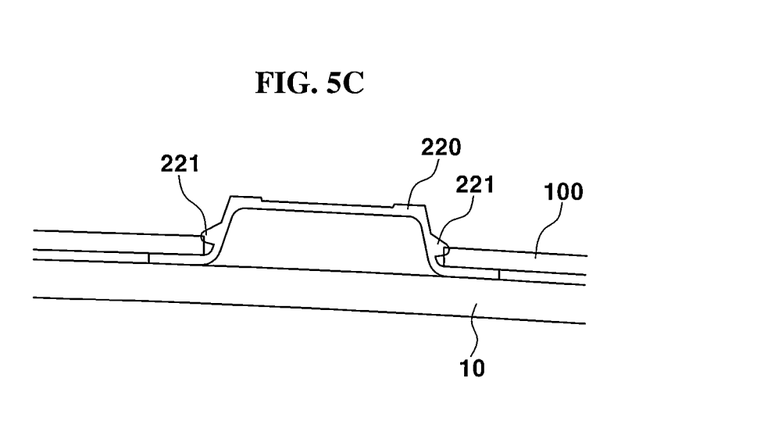
FIG. 5C is a side cross-sectional view of a fastening relationship of a roof airbag opening structure as another embodiment of the present disclosure.

FIGS. 5A-5C illustrate a fixation unit 200 which constitutes a bracket 220, as a different embodiment of the present disclosure.

The different embodiment of the present disclosure is described in an enlarged view of the Z area in FIG. 2, wherein the bracket 220 is fixed to the roof lining 10. Because one end of the bracket 220 disposed away from the roof airbag door 100 is hot-melt 300 coupled to the roof lining 10, the bracket 220 may be integrated with the roof lining 10 in an assembly process.

In other words, in the process, the bracket 220 is placed before placing the roof lining 10, and a hook-fixation portion 224 to be inserted into the fixation hole 223 in the bracket 220, is fixed to the roof panel 30. Therefore, the bracket 220 is fixed and positioned between the roof panel 30 and the roof lining 10 using the hook-fixation portion 224.

Because the bracket 220 is positioned to protrude from the upper surface of the roof lining 10, the bracket 220 is inserted into a locking hole 222 in the roof airbag door 100. Moreover, an external surface of the bracket 220 inserted into the locking hole 222 includes a hook portion 221 whose lower end has an elastic force. Therefore, in a state in which the locking hole 222 in the roof airbag door 100 fits the bracket 220, at least one hook portion 221 on the bracket 220 is configured to press the upper surface of the roof airbag door 100 adjacent to the locking hole 222.

Furthermore, provided is a slit portion 110 formed at an end of the roof airbag door 100 by extending from the locking hole 222 which fits the bracket 220. In fastening the roof airbag door 100 to the upper surface of the roof lining 10 on which the bracket 220 is positioned, the slit portion 110 allows the locking hole 222 in the roof airbag door 100 to easily fit the bracket 220.

As illustrated in FIG. 5C, two hook portions 221 are used. At least one hook portion 221 positioned on a side surface of the bracket 220 on the upper surface of the roof lining 10 is coupled to the upper surface of the roof airbag door 100.

As such, before the roof airbag 20 is deployed, the roof airbag door 100 is fixed on the upper surface of the roof lining 10 using the fixation unit 200. When the roof airbag 20 is deployed, the roof airbag door 100 is detached from the bracket 220 and falls into the interior of the vehicle in the direction in which the roof airbag 20 is deployed.

Figure 6:
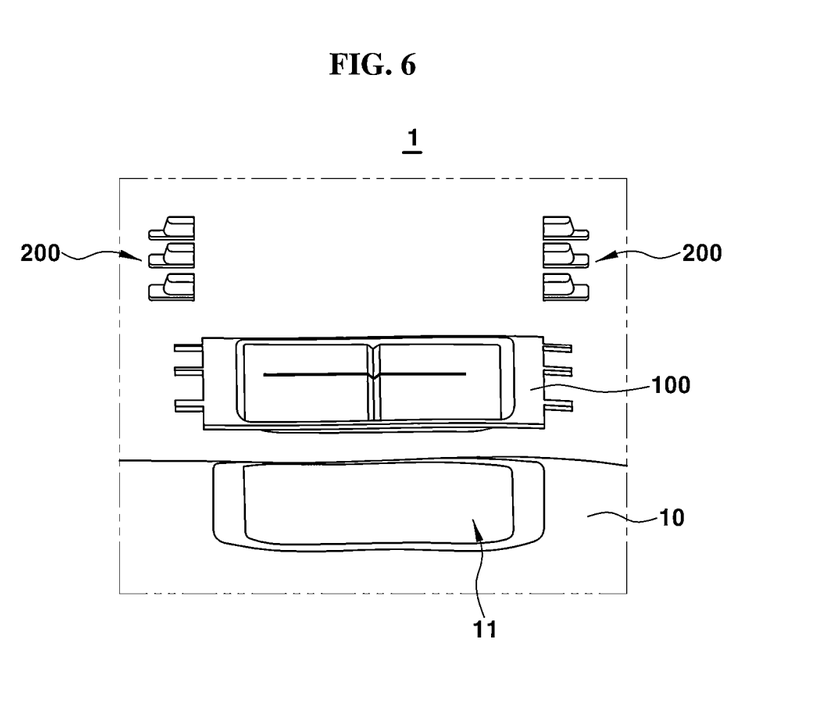
FIG. 6 illustrates a coupling process among a roof lining, a roof airbag door of a roof airbag opening structure, and a fixation portion of a roof airbag opening structure, as an embodiment of the present disclosure.

FIG. 6 illustrates a coupling process among the roof lining 10, the roof airbag door 100, and the fixation portion 210, as an embodiment of the present disclosure.

In one embodiment of the present disclosure, the fixation unit 200 includes the fixation portion 210, and the fixation portion 210 is positioned to integrally press the roof lining 10 against the roof airbag door 100.

In fixing the roof lining 10, the roof airbag door 100 is fixed in place on the upper surface of the roof lining 10 using a jig (not illustrated). Thereafter, when placing the fixation portion 210 of the fixation unit 200, one end of the fixation portion 210 disposed away from the opening 11 is hot-melt 300 coupled to the upper surface of the roof lining 10. With this configuration, the fixation portion 210 may integrally press the roof lining 10 against the roof airbag door 100.

The roof airbag 20 is coupled to the roof panel 30 or to the roof frame, and the roof lining 10 is integrally coupled to the roof panel 30, completing the process of assembling the interior finish of the vehicle.

As it should be apparent from the above description, the present disclosure may obtain the following effects by the configuration, combination, and operation relationship described above with the present embodiment.

The present disclosure provides an opening structure 1 for a roof airbag in which a roof airbag door is detached from a roof lining when the roof airbag is deployed, ensuring the safety of passengers.

Moreover, the present disclosure provides a fixation unit disposed on an interior surface of the roof lining, maintaining aesthetics even when the roof airbag door is coupled.

Furthermore, according to the present disclosure, the fixation unit may strengthen component performance and assembly between the roof lining and the roof airbag door.

The detailed description is merely illustrative of the present disclosure. In addition, the above description shows and describes the embodiments of the present disclosure, but the present disclosure can be used in various other combinations, modifications, and environments. In other words, changes or modifications are possible within the scope of the inventive concept of the present disclosure disclosed herein, the scope of equivalents to the described disclosure, and/or the scope of skill or knowledge in the art. The embodiments describe the best state for implementing the technical idea of the present disclosure, and various changes required for specific application fields and uses of the present disclosure are possible. Therefore, the detailed description of the present disclosure is not intended to limit the present disclosure to the disclosed embodiments. Also, the appended claims should be construed to include other embodiments.

What is claimed is:

1. An opening structure for a roof airbag, the opening structure comprising:
   a roof lining including an opening;
   the roof airbag disposed at an interior side of the roof lining;
   a roof airbag door disposed at the opening in the roof lining at a position where the roof airbag is configured to be deployed; and
   a fixation unit positioned between the roof airbag door and the roof lining,
   wherein the roof airbag door has an outer lining inserted into and overlapping the roof lining, and
   wherein the roof airbag door is fully detached from the roof lining and falls into an interior of a vehicle in response to deployment of the roof airbag.

2. The opening structure of claim 1, wherein the fixation unit comprises a fixation portion positioned on one surface of the roof lining and configured to press against the roof airbag door that is inserted to overlap the roof lining.

3. The opening structure of claim 2, wherein the fixation portion comprises at least one toothed structure provided at a position where the fixation portion faces the roof airbag door.

4. The opening structure of claim 2, wherein one end of the fixation portion disposed away from the roof airbag door is hot-melt coupled to the one surface of the roof lining.

5. The opening structure of claim 1, wherein the fixation unit comprises:
   a bracket disposed at one surface of the roof lining; and
   at least one hook portion protruding from an external side of the bracket, and
   wherein the bracket is inserted into a locking hole formed in the roof airbag door, and
   wherein the hook portion is positioned at one surface of the roof airbag door adjacent to the locking hole.

6. The opening structure of claim 5, further comprising:
   a fixation hole formed in the bracket; and
   a hook-fixation portion inserted into the fixation hole and fastened to a roof panel.

7. The opening structure of claim 5, wherein one end of the bracket disposed away from the roof airbag door is hot-melt coupled to one surface of the roof lining.

8. The opening structure of claim 1, further comprising a slit portion formed in the roof airbag door adjacent to a locking hole.

9. The opening structure of claim 1, further comprising a groove formed in the roof airbag door in at least one direction.

10. The opening structure of claim 1, wherein the roof airbag door is configured to be detached from the fixation unit when the roof airbag is deployed.

11. The opening structure of claim 10, wherein a locking hole in the roof airbag door is detached from a bracket when the roof airbag is deployed.

* * * * *